Sept. 14, 1937.  B. S. OKNER ET AL  2,092,985
PILLOW BLOCK
Filed Feb. 6, 1936   2 Sheets-Sheet 2
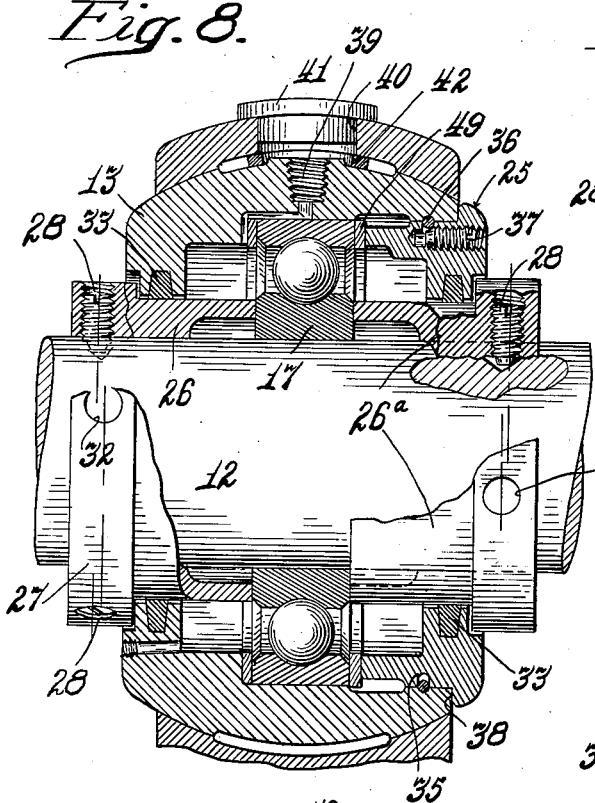
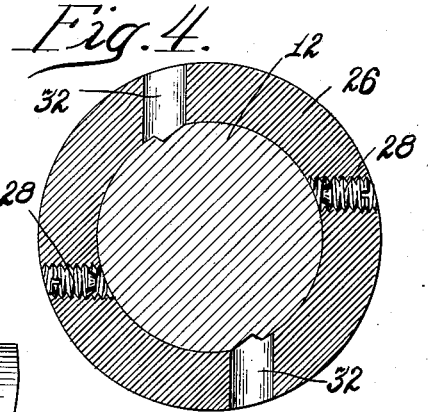
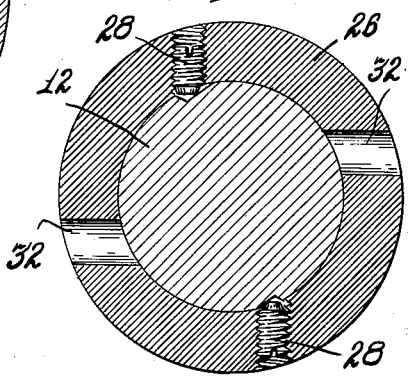
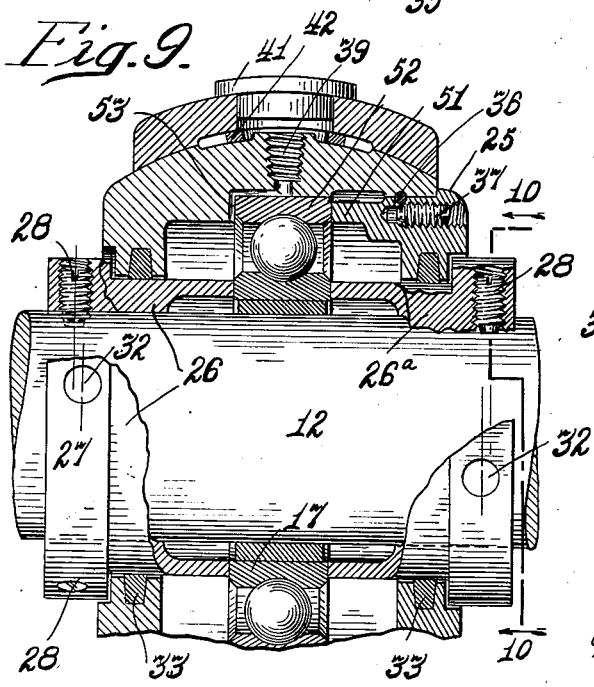
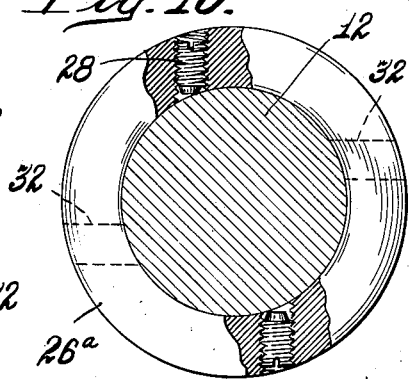
Inventors
Bernard S. Okner
and Charles Nelson, Jr.
Attorney.

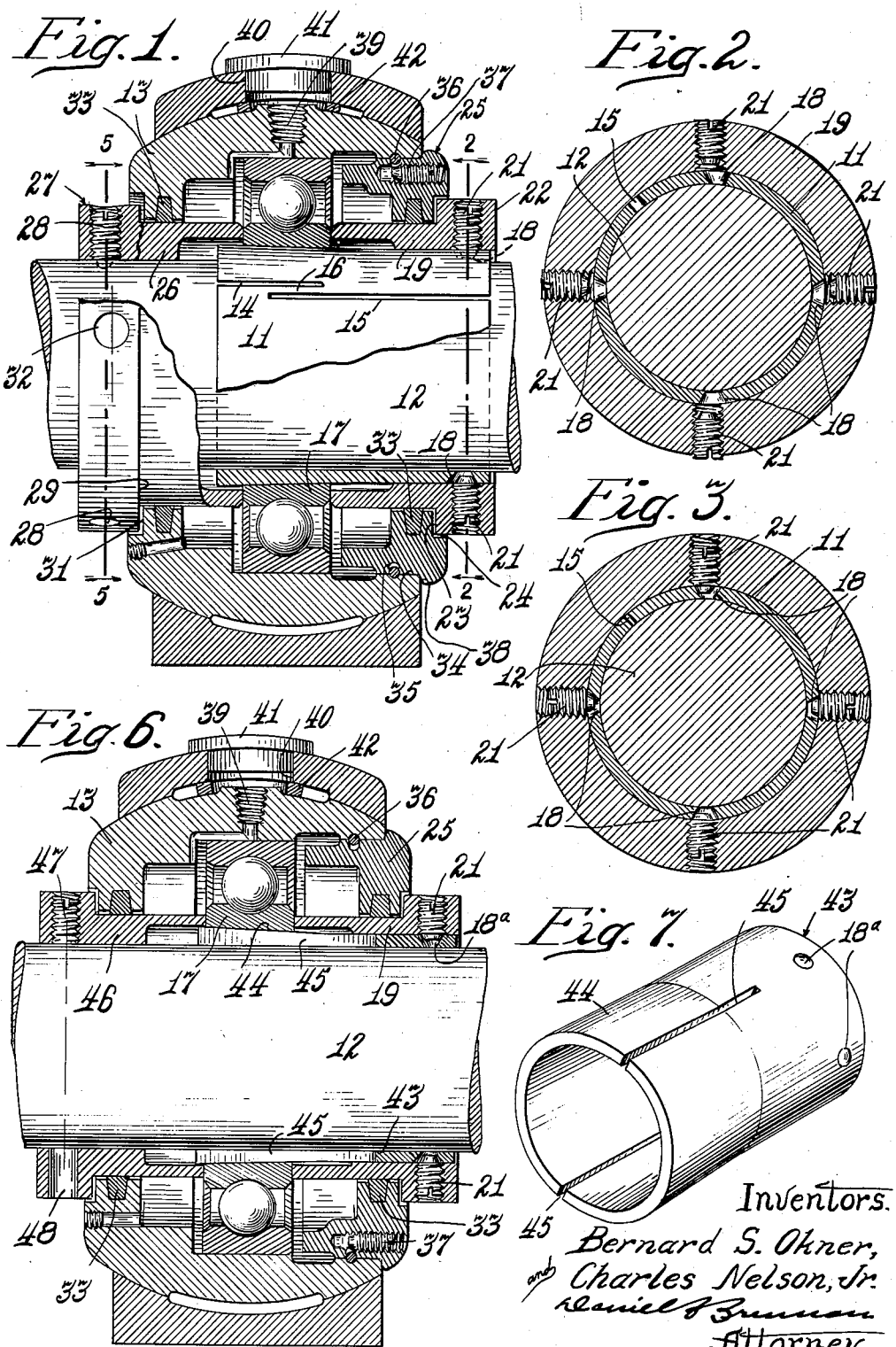

Patented Sept. 14, 1937

2,092,985

UNITED STATES PATENT OFFICE 2,092,985

PILLOW BLOCK

Bernard S. Okner and Charles Nelson, Jr., Chicago, Ill., assignors to Ahlberg Bearing Company, a corporation of Illinois Application February 6, 1936, Serial No. 62,602

17 Claims. (Cl. 308—236)

The invention relates to improvements in pillow blocks of the general type shown and described in our Patent No. 2,052,108, issued August 25, 1936, of which this application is a continuation-in-part, and more particularly to an improved anti-friction bearing mounting embodying improved means for positioning and locking anti-friction bearings either of the fixed or floating type on straight shafts and adequate means to retain an oil lubricant within the mounting and exclude foreign matter and moisture therefrom.

One known method of securing the inner race of an anti-friction bearing to a straight shaft is with a long adapter sleeve having a tapered outside periphery over which the inner bearing race fits. In such method the adapter sleeve is externally threaded at one end and split its entire length. A collar is screwed on said sleeve to force the inner race along said sleeve to bind it thereto and contract the sleeve to bind it against the shaft. A common objection to such an assembly is that foreign matter enters the mounting through said slit and a liquid lubricant cannot be used because of excessive leakage along said slit.

Another objection is that the outside edges of the slit cut the sealing rings (usually felt or leather) fitted over the sleeve to prevent oil leakage and render them useless. Another objection to such method of securing the inner race is that the wedging action of the mating tapered surface of the inner race and the outside tapered surface of the sleeve creates an initial overload on the bearing which cannot be tolerated where extremely accurately fitted bearings are required.

Other known types of pillow block assemblies also lack means to locate accurately and secure the inner bearing race on the shaft to retain the bearing in its proper position relative to its housing. Such assemblies usually require the use of a spanner wrench to hold one part of the mounting while turning another part to contract the split adapter sleeve. The objections hereinbefore outlined are satisfactorily overcome in a practical manner by the improved pillow block assembly embodying the invention.

It is, therefore, an object of the invention to provide an improved pillow block for anti-friction bearings, involving novel means to prevent lubricant leakage and the entrance of foreign matter.

Another object is to provide an improved adapter sleeve for binding the shaft and the inner bearing race which will not create an initial overload on the bearing.

Another object is to provide in a mounting of the character referred to, novel means to prevent destruction of the sealing rings.

Another object is to provide a mounting for a bearing embodying improved securing means to insure a proper working clearance between moving parts.

Another object is to provide, in a pillow block mounting, novel means to accurately locate and lock the locking collar in binding engagement with the inner race of the anti-friction bearing to insure proper locating of the latter with respect to other parts of the mounting.

Another object is to provide a pillow block with means to removably secure an annular cap in the housing and other features hereinbefore outlined which can be readily and inexpensively constructed and is easy to assemble and highly efficient.

The foregoing and such other objects of the invention, as will become more apparent as the description proceeds, will be more readily understood from a perusal of the following specification.

Fig. 1 is a longitudinal central sectional view of one embodiment of the improved anti-friction bearing pillow block showing the adapter sleeve partially in elevation.

Fig. 2 is a transverse sectional view taken substantially on lines 2—2 of Fig. 1, showing the set screws in one type of locking collar in unlocked position.

Fig. 3 is a view similar to Fig. 2 showing the set screws in locked position and the adapter sleeve wrapped tightly around the shaft.

Figs. 4 and 5 are transverse sectional views taken substantially on line 5—5 of Fig. 1, showing another type of locking collar in position prior to and after being locked on the shaft.

Fig. 6 is a longitudinal central sectional view similar to Fig. 1, showing another embodiment of the invention.

Fig. 7 is a perspective view of the adapter sleeve used in the pillow block mounting illustrated in Fig. 6.

Fig. 8 is a longitudinal sectional view of another embodiment of the improved pillow block, showing a portion of the locking collar partially in elevation.

Fig. 9 is a fragmentary longitudinal sectional view of a pillow block illustrating another embodiment of the invention and showing a portion of the locking collar in elevation.

Fig. 10 is a transverse sectional view taken substantially on line 10—10 of Fig. 9.

The embodiment of the invention illustrated in Figs. 1, 2 and 3 inclusive include a male adapter sleeve 11, adapted to be fitted on a straight shaft 12. The sleeve 11 is inserted into the bearing housing 13 through either open end thereof and has longitudinal slits 14 and 15 each extending inwardly from opposite ends of said sleeve and spaced a short distance apart circumferentially to provide a relatively thin connecting wall portion 16 therebetween. The sleeve 11 also is tapered upwardly toward one end to receive slidingly thereover the inner bearing race 17 of an anti-friction bearing, and has circumferentially aligned countersinks 18 at its other end. The longitudinal slits 14 and 15 allow the adapter sleeve 11 to contract and bind on the shaft when the inner race is moved longitudinally thereover.

Longitudinal movement of the inner race over the tapered end of the adapter sleeve is accomplished by providing a female sleeve or locking collar 19 which fits snugly over the opposite end of the male sleeve 11. To assemble, the inner race is slipped over the male sleeve 11 and the female sleeve 19 is moved longitudinally on the male sleeve into abutment with one side face of said inner race. In this position bevel tipped set screws 21 in the flange 22 of said female sleeve are in approximately alignment with countersinks 18. When the set screws are tightened their bevel tips engage one side of the respective countersinks 18 and such engagement moves the female sleeve towards the tapered end of the male sleeve 11 to force the inner bearing race 17 over said taper to contract and bind the male sleeve to the shaft and the bearing race to said male sleeve. However, to rely entirely upon the binding action between the inside periphery of the inner bearing race and the tapered surface of the male sleeve to contract and hold said sleeve in binding engagement with the shaft 12 places the bearing race under an initial overload due to the tension of the sleeve toward expansion which is an objectionable feature of known types of adapter sleeves. The improved design relieves this overload and undesired tension is avoided by including means to effect a wrapping action of the adapter sleeve around the shaft, in addition to the wedging action of the bearing race over the taper.

As best shown in Figs. 2 and 3, the countersinks 18 in the male sleeve 11 are positioned in approximate alignment circumferentially with the set screws 21. It is preferable that four countersinks and set screws be provided and located as shown. The two countersinks on each side of the slit 15 are offset in a direction away from said slit with respect to the set screws 21 whereby, upon tightening, said bevel set screws engage the inclined edges of the countersinks. The bevel edge of each set screw engages its respective countersink on the side toward the slit 15, as shown in Fig. 3, to wrap or otherwise urge the sleeve tightly about the shaft and contract the slit 15.

The combination of the circumferentially and longitudinally offset countersinks and the tapered end of the sleeve 11 relieves the wedging action to eliminate overload on the bearing race while affording an ideal method of locking the adapter sleeve to the shaft with its component parts, the inner race of the bearing and the locking collar. As the slit 15 terminates short of one end of the sleeve 11 and its companion associated slit 14 terminates short of the other end of the sleeve 11, there is no continuous slit or passage through which oil lubricant may pass out of the bearing or foreign matter into the bearing. Also the slits 14 and 15 terminate inwardly of the edges of the overlying bearing race 17 to prevent lubricant from crossing over the wall portion 16 from one slit to the other on the outside circumferential face of the sleeve. The flange 22 of sleeve 19 provides a shoulder 23 adapted to be spaced from a recessed face 24 in an annular cap 25 removably secured in the open end of the housing 13 in a manner to be more fully described hereinafter.

Another female sleeve or locking collar 26, externally flanged at 27 is secured to the shaft 12 by bevel set screws 28, and projects inwardly through the bored end wall of the housing 13 to tightly abut the other side face of the inner race 17. The flange 27 provides a shoulder 29 adapted to be spaced from a recessed face 31 in the housing end wall. The bearing race 17 is centered and tightly locked between the female sleeves 19 and 26 to prevent passage of lubricant inside said sleeves preferably by providing two set screws 28 and two tool openings 32 in the flange 27. As shown, the tool openings 32 are circumferentially spaced between the set screws and preferably are offset longitudinally inwardly toward the race. The set screws and the tool openings also are offset circumferentially from the diametrical center of the shaft for purpose to be described hereinafter.

In assembling, the sleeve 26 is moved along the shaft against one side face of the inner race 17 so that the shoulder 29 abuts the recessed face 31 of the housing wall, and the set screws 28 are temporarily tightened. Said shaft is then countersunk through tool openings 32, as shown in Fig. 4. After countersinking the shaft, the set screws 28 are loosened and the sleeve is rotated about the shaft to locate the set screws in approximate alignment with the countersinks. As the set screws 28 are tightened to engage the countersinks in the shaft, the sleeve is forced tightly against the face of the inner race 17 because of the engagement of the bevel edge of set screws 28 with one side of the approximately aligned countersinks and also because of the rolling action of the bevel set screws on the countersinks. Obviously, upon positioning and locking the sleeve 19 in position against the one face of the inner race 17 and then locking the sleeve 26 in place, the bearing race is accurately positioned and tightly bound or wedged between the inner ends of the opposed sleeves, hence, no oil lubricant can escape along the faces of the inner race and along the shaft 12 or sleeve 11 beneath sleeves 19 and 26.

As shown, the housing 13 and the annular cap 25 each carry a sealing ring 33, preferably of felt or leather packing, which when the mounting is assembled fit snugly around the peripheries of sleeves 19 and 26, respectively, to provide a seal.

As hereinbefore noted, the annular cap 25 has a tight fit in the open end of housing 13. Any known practical means may be used to secure said cap in place, however, it is preferable to use the novel detachable securing means illustrated and best shown in our co-pending application noted hereinbefore. Briefly, the inside periphery 34 of the housing 13 has a shallow groove spaced inwardly a short distance from the face of the housing. The annular cap 25 also has an external peripheral groove 35, normally offset outwardly from the groove in the housing, which contains a normally contracted split wire ring 36. One or more set screws 37 are screwed into tap openings in the annular cap, each having a bevel end to engage inside the split ring 36 to urge said ring outwardly of its groove into engagement with the groove in housing 13. When the split ring is expanded, the cap is securely held in place in the open end of the housing 13. Engagement of the split ring into the annular groove of the housing affords means to move the annular shoulder 38 of the cap tightly against the housing wall to prevent oil leakage. This mode of assembly permits easy removal of the annular end cap 25 when the mounting is disassembled, such removal being readily affected by forcing the cap outwardly to urge the split ring out of the groove in the housing after all the set screws 37 have been withdrawn from engagement with said ring.

A lubricant is admitted into the bearing mounting through a tap hole 39 provided in the upper portion of the housing 13. Access to said hole is obtained thru a suitable opening 40 in the pillow block which preferably is closed by a removable dust cap 41. The dust cap prevents accumulation of foreign matter about the plug normally screwed into the tap hole 39. A packing washer 42 preferably is placed about the tap hole 39, between the housing 13 and the mounting therefore, to prevent any foreign matter which may accumulate around said hole from entering between said housing and mounting.

It is apparent from the foregoing description that the improved anti-friction shaft mounting is thoroughly sealed to prevent leakage of a liquid lubricant which heretofore could not be used to complete satisfaction. Also, the provision of continuous unbroken surfaces upon which the sealing rings 33 ride maintain the seals in first class condition. The novel structure of the male adapter sleeve 11 insures positive contraction of the sleeve to tightly grip the shaft without placing the bearing under an overload and also prevents leakage of lubricants.

The pillow block illustrated in Figs. 6 and 7 and shown in our application which issued into the patents aforesaid is substantially like that previously described, but in this instance an adapter male sleeve 43 has an upward taper 44 at one end to provide a suitable seat for the tapered inside bore of the inner bearing race 17, and circumferentially aligned countersinks 18a at its other end. The sleeve 43 has longitudinal slits 45 at its tapered end to permit it to contract when the inner race 17 is moved longitudinally thereover. Longitudinal movement of the inner race 17 over the taper 44 is accomplished in the same manner as movement of the inner race over the tapered adapter sleeve 11 shown in Fig. 1, the bevel tipped set screws 21 in the female sleeve 19 engaging in the approximately aligned circumferentially spaced countersinks 18a. However, inasmuch as the sleeve is not slit over its entire length no wrapping action is effected. A second female sleeve 46 is locked on the shaft and extends through the housing end wall for abutment against the other face of the race. Set screws 47 therein may engage the surface of the shaft or the shaft may be countersunk by a tool inserted through tool openings 48. In other respects the pillow block structure is like that shown in Fig. 1, and like numerals indicate like parts.

The mounting illustrated in Fig. 8 embodies a structure in which the inner race 17 is mounted directly upon the shaft 12 and is securely held in position with respect to the housing 13 by opposed sleeves or locking collars 26 and 26a, the latter of which preferably is generally similar to the collar 26 except that the tool openings and set screws therein are offset diametrically in a direction opposite to those in collar 26. Obviously upon positioning and locking the collar 26a in position against the one face of the inner race 17 and then locking the collar 26 in place, the inner race is accurately positioned and is tightly bound or wedged between the inner ends of said collars, hence, no oil lubricant can escape along the faces of the inner race and along the shaft 12 beneath said collars.

The pillow block shown in Figs. 9 and 10 is substantially like that shown in Fig. 8, and like numerals indicate like parts. In this structure the shaft 12 is not countersunk to receive the beveled set screws 28 in sleeve 26a but said set screws engage directly upon and roll along the surface of said shaft upon being tightened, thus urging the sleeve inwardly against one face of the bearing race 17. Binding of the inner race is insured by the inward movement of the other sleeve 26 upon tightening set screws 28 therein for engagement with the longitudinally offset countersinks provided in the shaft by drilling through offset drill openings 32. The structure illustrated differs further from that of Fig. 8 in that a fixed anti-friction bearing is shown, whereas in Fig. 8 a floating anti-friction bearing mounting having felt spacers 49 is illustrated. This difference in bearing mounting is accomplished by providing a longer inwardly directed flange 51 on the annular cap 25, which abuts tightly against one face of the outer race 52 for binding it between said flange and a shoulder 53 in the housing 13.

From the foregoing it is evident that the improved pillow block embodies novel means to prevent entrance of foreign matter into the bearing or between the various moving parts and that improved means also is provided to removably retain the annular cap within the housing. It is also apparent that the sealing rings are saved from the destructive wear encountered in known types of mountings because of the non-slitted surface provided by the improved female sleeve or locking collar. Tight sealing of the anti-friction bearing within the pillow block permits the use of an oil lubricant, while the general construction of the mounting insures accurate and permanent location of the anti-friction bearing within the pillow block and further provides a serviceable pillow block for very heavy radial loads wherein shaft deflections are compensated for in the ball and socket housing mounting which is adequately protected against injury by suitable means to prevent entrance of foreign matter between the moving parts thereof.

Although exemplary embodiments of the improved mounting have been illustrated in the accompanying drawings and described in detail in the foregoing specification it is to be understood that the structure shown may vary in detail and that metal or other known types of sealing rings may be used without departing from the spirit of the invention or the scope of the appended claims.

We claim:

1. A device of the character described including, in combination, a male sleeve having an external taper at one end and countersinks at the other end, adapted to be mounted on a shaft and slidingly receive the inner race of an anti-friction bearing, a female sleeve mounted on said male sleeve, means in said female sleeve co-operating with said countersinks adapted to urge the female sleeve into abutment with the race to move said race along the taper and lock said female sleeve to the male sleeve, longitudinal slits in said male sleeve one extending inwardly from each end adapting it to bind on the shaft when the race is urged along said taper, said slits being neither directly nor indirectly connected with each other, and another sleeve adapted to be secured to said shaft and abut the other face of said race.

2. A device of the character described including, in combination, a male sleeve having an external taper at one end and countersinks at the other end, adapted to be mounted on a shaft and slidingly receive the inner race of an anti-friction bearing, a female sleeve mounted on said male sleeve, a pair of closely spaced apart longitudinal slits in said male sleeve, one of said slits extending inwardly from each end, and having its inner end extend longitudinally beyond the inner end of the other slit, means in said female sleeve co-operating with said countersinks adapted to urge the female sleeve into abutment with the race to move said race along the taper and lock said female sleeve to the male sleeve, said means and said race co-operating to contract the male sleeve to wrap it tightly about and bind it to the shaft, and another sleeve adapted to be secured to said shaft and abut the other face of said race.

3. A device of the character described including, in combination, a male sleeve having an external taper at one end and countersinks at the other end, adapted to be mounted on a shaft and slidingly receive the inner race of an anti-friction bearing, a female sleeve mounted on said male sleeve, a pair of longitudinal slits in said male sleeve and means in said female sleeve co-operating with said countersinks adapted to urge the female sleeve into abutment with the race to move said race along the taper and lock said female sleeve to the male sleeve, said means and said race co-operating to contract the male sleeve to wrap it about the shaft.

4. A device of the character described including, in combination, a male sleeve having an external taper at one end and countersinks at the other end, adapted to be mounted on a shaft and slidingly receive the inner race of an anti-friction bearing, a female sleeve mounted on said male sleeve, a pair of longitudinal slits in said male sleeve, set screws in said female sleeve normally offset longitudinally from but adapted to co-operate with said countersinks to urge the female sleeve into abutment with the race to move said race along the taper and lock said female sleeve to the male sleeve, said means and said countersinks also co-operating to contract the male sleeve to bind it to the shaft, and another sleeve adapted to be secured to said shaft and abut the other face of said race.

5. In a device of the class described, the combination of, a male sleeve adapted to retain a shaft and carry an anti-friction bearing, an external taper at one end of said sleeve, countersinks at the other end, circumferentially spaced longitudinal slits in said sleeve, one extending inwardly from each end, said slits being in close proximity to each other, and overlapping a short distance at their inner ends, with a female sleeve adapted to be mounted on said male sleeve and abut the anti-friction bearing, said female sleeve having means to engage said countersinks to lock it on said male sleeve and to wrap said male sleeve tightly about said shaft.

6. In a device of the class described, the combination of, a male sleeve externally tapered at one end adapted to be fitted around a shaft and carry an anti-friction bearing on said tapered end, countersinks at the other end, two longitudinal slits in said sleeve extending inwardly one from each end and overlapping a short distance at their inner ends, with a female sleeve adapted to be mounted on said male sleeve and abut the anti-friction bearing, said female sleeve having means to engage said countersinks to lock it on said male sleeve and wrap said male sleeve tightly about said shaft.

7. In a device of the character described including a housing, the combination of, a male sleeve externally tapered at one end adapted to be mounted on a shaft and slidingly receive the inner race of an anti-friction bearing on its tapered end, a female sleeve adapted to be mounted on the other end of said male sleeve and abut one face of said race to urge it along said taper, means in said female sleeve adjustable to lock said female sleeve on said male sleeve, and a pair of longitudinal slits in said male sleeve adapting it to wrap about said shaft when the inner race is urged along said sleeve.

8. In a device of the character described including a housing, the combination of, a male sleeve externally tapered at one end adapted to be mounted on a shaft and slidingly receive the inner race of an anti-friction bearing on its tapered end, circumferentially aligned spaced countersinks in the other end of said sleeve, a pair of longitudinal slits in said sleeve, a female sleeve adapted to be mounted on said end of said male sleeve and abut one face of said race to urge it along said tapered end and contract said sleeve about the shaft, circumferentially aligned set screws in said female sleeve, said set screws being offset circumferentially from said countersinks whereby said set screws engage the countersinks upon being drawn tight to wrap the male sleeve tightly to the shaft.

9. In a device of the character described, a locking sleeve, adapted to be mounted on a shaft, having circumferentially aligned spaced openings adapted to receive a tool to countersink the shaft, said openings being parallel to and offset circumferentially from the diametrical center of said shaft, and circumferentially spaced aligned set screws spaced one midway between adjacent openings and offset longitudinally from the plane of said openings, said set screws having a bevel face and being offset circumferentially from the diametrical center of said shaft for engagement in the countersinks upon relocating said sleeve on said shaft.

10. In a device of the character described, the combination of, a housing, adapted to have a shaft extend therethrough, and an anti-friction bearing having its outer race mounted in said housing and its inner race mounted on said shaft, said housing including an integral bored end wall and being open at its other end, an annular cap, having a bore, mounted in said open end, and sealing rings in said bores, with means to locate and secure said bearing in place, said means comprising in combination, a sleeve mounted in said housing adapted to be secured to said shaft and abut one face of the inner race, a second sleeve mounted in said housing on said shaft, having circumferentially aligned spaced openings adapted to receive a tool to countersink the shaft, said openings being parallel to and offset circumferentially from the diametrical center of said shaft, and circumferentially spaced aligned set screws spaced one midway between adjacent openings and offset longitudinally from the plane of said openings, said set screws being offset circumferentially from the diametrical center of said shaft for engagement in the countersinks upon relocating said sleeve on said shaft, said sleeve being adapted to tightly abut the other face of the inner race to retain said bearing in place, and an unbroken periphery on each of said sleeves adapted to co-operate with said sealing rings.

11. In a device of the character described, a locking sleeve, adapted to be mounted on a shaft, circumferentially aligned spaced set screws in said sleeve parallel to and offset circumferentially from the diametrical center of said shaft, and a bevel face on said set screws adapted for rolling engagement with said shaft to urge the sleeve longitudinally along said shaft and lock it in place.

12. In a device of the character described, the combination of, a housing, adapted to have a shaft extend therethrough, and an anti-friction bearing having its outer race mounted in said housing and its inner race mounted on said shaft, said housing including an integral bored end wall and being open at its other end, an annular cap, having a bore, mounted in said open end, and sealing rings in said bores, with means to locate and secure said bearing in place, said means comprising, in combination, a sleeve mounted in said housing adapted to be secured to said shaft and abut one face of the inner race, a second sleeve mounted in said housing on said shaft, circumferentially aligned space set screws in said second sleeve, said set screws being parallel to and offset circumferentially from the diametrical center of said shaft, and a bevel face on said set screws adapted for rolling engagement with said shaft to urge the sleeve longitudinally along said shaft and lock it in place, said sleeve being adapted to tightly abut the other face of the innner race to retain the bearing in place, and an unbroken periphery on each of said sleeves adapted to co-operate with said sealing rings.

13. A locking sleeve adapted to be mounted upon a shaft, comprising an annulus having circumferentially aligned spaced tapped openings, said openings being parallel to and offset circumferentially from the diametrical center of said shaft, and set screws one in each of said tapped openings having a bevel face for a rolling engagement with said shaft prior to final tightening of said screws to secure the annulus to said shaft.

14. A sleeve for an anti-friction bearing mounting adapted to be mounted on a shaft, said sleeve having at least one pair of longitudinal slits therein, one of said pair extending inwardly from each end and overlapping its associated slit for a short distance at their inner ends, each of said slits being entirely separate from its associated slit, and means at one end of said sleeve adapted to be engaged to contract said sleeve and wrap it tightly about said shaft.

15. A sleeve for an anti-friction bearing mounting adapted to be mounted on a shaft, said sleeve having at least one pair of longitudinal slits therein, one of said pair extending inwardly from each end and overlapping its associated slits for a short distance at their inner ends to define a flexible connecting wall portion, each of said slits being entirely separate from its associated slit, and means at one end of said sleeve adapted to be engaged to contract said sleeve and wrap it tightly about said shaft.

16. In a device of the character described, a locking sleeve, adapted to be mounted on a shaft, having a circumferentially aligned spaced openings adapted to receive a tool to countersink the shaft, said openings being parallel to and offset circumferentially from the diametrical center of said shaft, and circumferentially spaced aligned means spaced between adjacent openings and offset longitudinally from the plane of said openings, said means being offset circumferentially from the diametrical center of said shaft for co-operative engagement with said countersinks upon relocating said sleeve on said shaft.

17. In a device of the character described, a locking sleeve, adapted to be mounted on a shaft, having circumferentially aligned spaced openings adapted to receive a tool to countersink the shaft, said openings being parallel to and offset circumferentially from the diametrical center of said shaft, and circumferentially spaced aligned set screws spaced one between adjacent openings, said set screws having a bevel face and being offset circumferentially from the diametrical center of said shaft for engagement in the countersinks upon relocating said sleeve on said shaft.

BERNARD S. OKNER.
CHARLES NELSON, Jr.